June 8, 1965 P. F. GIOMETTI 3,187,863
ONE-WAY CLUTCH
Filed Feb. 11, 1963
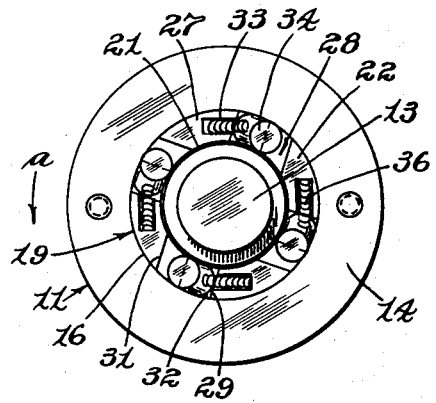
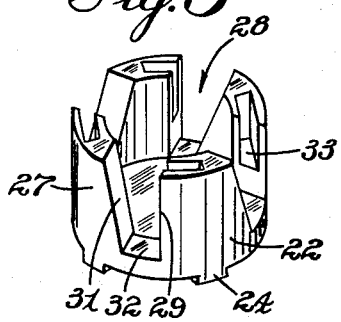
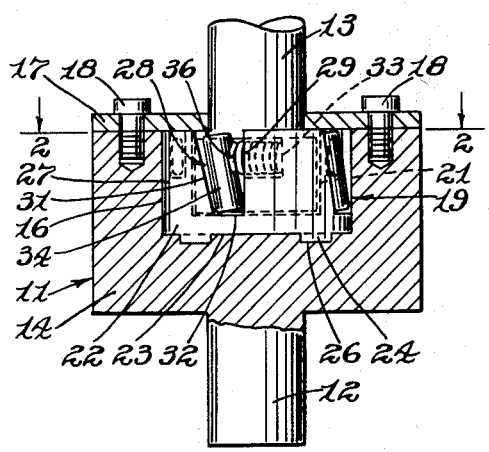
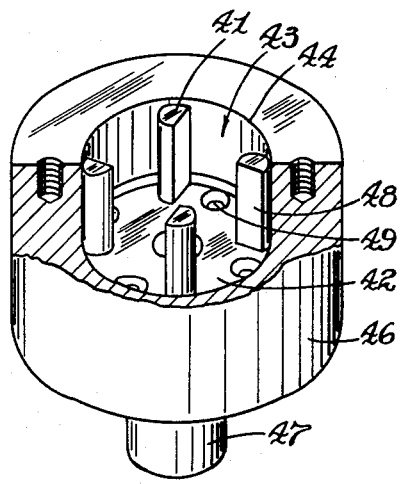
Fig. 2
Fig. 3
Fig. 1
Fig. 4
WITNESS:
Esther M. Stockton
INVENTOR.
Paul F. Giometti
BY John Phillips Ryan
ATTORNEY

United States Patent Office 3,187,863
Patented June 8, 1965

3,187,863
ONE-WAY CLUTCH
Paul F. Giometti, Elmira, N.Y., assignor to The Bendix Corporation, Elmira, N.Y., a corporation of Delaware
Filed Feb. 11, 1963, Ser. No. 257,571
11 Claims. (Cl. 192—45)

The present invention relates to a one-way engaging device and more particularly to one-way clutches or brakes using roller elements.

One-way clutches and brakes of the roller type are well known and generally include a plurality of rollers, a like plurality of roller biasing means, and an inner and an outer race, one of the races having a cylindrical surface while the other race is specially formed or machined to have recessed camming surfaces. The cam surfaces are generally formed by expensive machining operations. In those instances where the camming surfaces are formed in the outer race, it is desirous that the housing of the outer race possess sufficient strength after machining to withstand the tremendous forces created when the rollers become wedged between the camming surfaces and the inner race. To insure sufficient strength in the outer race housing after machining, therefore, requires an expensive and wasteful use of surplus housing metal. Cold forming methods have been tried in an effort to reduce costs but these efforts, while successful to a degree, have not been wholly satisfactory.

It is, therefore, an object of the present invention to provide a one-way clutch or brake which is facile, reliable in operation, durable, and economical to manufacture and fabricate.

It is another object of the present invention to provide a one-way roller clutch or brake which eliminates the need for specially formed or machined cam surfaces.

It is another object of the present invention to provide a one-way engaging device including concentrically spaced cylindrical inner and outer races which are free of recessed cam surfaces with roller means positioned between the races and pivotally supported for roller movements between parallel and non-parallel positions relative to the axis of the races whereby the device provides an overrunning coupling when the roller means assume the parallel position, and when the roller means assume the non-parallel position the device provides a one-way coupling.

It is still another object of the present invention to provide a one-way engaging device utilizing wedging roller elements wherein means are provided to limit the torque transmitted by the wedged roller elements thereby effectively limiting the stresses to which one or both of the device's races are subjected.

With the above and other objects in view which will appear as the description proceeds, this invention resides in the novel construction, combination and arrangement of parts substantially as hereinafter described and more particularly defined in the appended claims, it being understood that such changes in the precise embodiments of the hereindisclosed invention may be made as come within the scope of the claims.

The accompanying drawing illustrates two embodiments of the invention constructed according to the best modes so far devised for the practical application and principles thereof and, in which:

FIGURE 1 is a side elevational view of a one-way clutch or brake embodying the invention, portions thereof being broken away and in section for the sake of clarity, the roller means being illustrated in a non-parallel driving position;

FIGURE 2 is a plan view with the end plate removed of the device illustrated in FIGURE 1 as taken on the plane of line 2—2 of FIGURE 1;

FIGURE 3 is a detail perspective view of the carrier or reaction member utilized in the embodiment illustrated in FIGURES 1 and 2; and FIGURE 4 is a fragmentary detail view of the outer race, the reaction members and roller pivotal supports of a second embodiment of the invention, portions of the view being broken away and in section for the sake of clarity.

Referring now more particularly to the accompanying drawing in which like reference characters indicate like parts, the numeral 11 generally designates a one-way clutch for coupling a driving shaft 12 to an aligned driven shaft 13. A body member 14, illustrated as an integral part of the driving shaft but not necessarily so limited, includes an outer race 16 having a smooth unmarred cylindrical race surface. An end plate 17 is secured to the outer race of the body by means of cap screws 18. The body, the outer race and the end plate in combination define a central clutch cavity generally designated 19.

An inner race 21, also having a smooth unmarred cylindrical race surface, is formed on the driven shaft and is positioned within the central clutch cavity in spaced concentric relationship with the outer race. The outer and inner races, as previously noted, both have smooth cylindrical race surfaces which are not marred by the conventionally formed or machined recessed or raised cam surfaces. The entire cylindrical surfaces of the races in the present invention provide the cam surfaces.

A carrier element or retarder member 22 is fixedly secured to the base portion 23 of the central clutch cavity by lug members 24 which cooperate with the complementing notches 26. The carrier element includes an annular body member 27 disposed in the spatial separation between the inner and outer races. A plurality of axially extending circumferentially spaced recesses generally designated 28 are provided in the carrier's annular body. The recesses comprise an axially extending wall 29 parallel with the axis of the carrier and the races and an angularly disposed wall 31. The extent of angular disposition of the wall 31 will effectively establish the torque transmitting capabilities of the clutch as will be hereinafter more completely described. The walls 29 and 31 are joined together by a flat bottom wall 32 which is substantially perpendicular to the axis of the carrier and the races. A spring cavity 33 in the wall 29 opens into each recess adjacent the open end of the recess.

A roller 34 of a predetermined diameter is positioned in each carrier recess 28. The roller diameter and the recess bottom wall 32 are dimensionally matched to provide a pivotal support for the inner axial extremity of the roller to allow roller pivotal movements between positions parallel with the axis of the races and parallel to the recess wall 29 or non-parallel with the axis of the races and parallel to the angularly disposed recess wall 31. A spring 36 is partially supported within the spring cavity 33 of the carrier to compressively engage the outer axial extremity of the roller to normally bias the roller to its non-parallel position as is best illustrated in FIGURE 1. The end plate 17 abuts the free extremity of the carrier to confine the rollers and the compression springs in position in their respective supporting recesses.

In operation—when the driving shaft 12 is rotated in the direction a (FIGURE 2) and the driven shaft 13 is stopped, the outer race 16 and carrier 22 will then rotate relative to the inner race 21. The inner race will drivingly engage the rollers 34 and rotate the rollers in a counterclockwise direction. Counterclockwise rotation of the rollers, the friction created between the rollers and the races, and the bias of the compression spring 36 when coupled with the recess pivotal support of the inner axial extremity of the rollers, will cause the rollers to assume a non-parallel or tilted position best illustrated in FIGURE 1. In the non-parallel position the rollers will become wedged or cocked between the adjacent smooth cylindrical surfaces of the inner and outer races thereby establishing a driving connection between the driving and driven shafts. In the wedged condition the rollers will have four points of contact, i.e., a single point of contact between the roller and the inner race and two points of contact, one adjacent each extremity of the roller, with the outer race and a point of contact in the pivotal support. It has already been noted that the extent of the angular displacement of the carrier recess wall is of extreme importance. The greater the angular displacement of the wall relative to the axis of the races, then the greater will be the degree of wedging action permitted between the rollers and the races of the device. Predetermined angular displacement of the wall 31 can be utilized to limit the degree of roller wedging action thereby effectively establishing the torque transmitting capabilities of the device. Being able to limit the torque capacities provides an added benefit in that effective means are thereby provided to limit radial and circumferential stresses to which the outer race may be subjected. When the driven shaft 13 is rotated at a speed greater than the driving shaft 12, then the inner race 21 will rotate relative to the outer race. The inner race will tend to rotate the rollers in a clockwise direction. The friction created between the rollers and the races, coupled with the reversed roller rotation, tends to overcome the spring bias and pivotally urges the rollers to their parallel position thereby allowing the shafts to overrun. When the rollers assume the parallel position, there will be line contact between the entire axial length of the rollers and the races as well as point contact between the rollers and their pivotal supports. Line contact between the rollers and the races in the wedged condition, if desirable, can be accomplished by contouring the race surfaces.

FIGURE 4 partially illustrates a second embodiment of the invention. This embodiment differs from the previously described embodiment in that the carrier element has been entirely eliminated. A plurality of pin members 41 are secured to the base portion 42 of the central clutch cavity generally designated 43 formed by the outer race 44 and the body 46. The body 46, as in the previous embodiment, is affixed to a driving shaft 47. The pin members extend into the spatial separation defined by the outer race 44 and the inner race (not shown). Each pin has a flatted side wall 48. A like plurality of frustoconical depressions 49 are formed in the base 42 adjacent the flatted surfaces of the pins. A roller (not shown) is positioned in each depression thereby providing pivotal support for the roller. A spring (not shown) is confined between the pin and the outer extremity of each roller to normally bias the roller to a pivoted non-parallel position. The operation of the embodiment of FIGURE 4 is similar to the above described operation for the embodiment of the invention illustrated in FIGURES 1 and 2.

It will be readily apparent to those skilled in the art that the invention fulfills the previously stated objects and particularly eliminates the need for specially formed or machined camming surfaces. The necessity for providing wasteful surplus materials in the outer race body or housing to insure sufficient mechanical strength adjacent the formed camming surfaces also is effectively eliminated.

I claim:

1. An overrunning coupling comprising:
   an inner race;
   an outer race situated in concentric relationship to the inner race, said races having smooth cylindrical race surfaces;
   a clutch roller of a predetermined diameter engageable with the races for establishing a one-way connection between the races;
   means pivotally supporting the roller for allowing roller movements between positions parallel and non-parallel with the axis of the races; and,
   resiliently yieldable means engaging the roller and adapted to urge the roller to one of its positions, said roller being adapted to become wedged between the races when in a non-parallel position and when one of said races is rotating relative to the other of said races thereby establishing the one-way connection, said roller being further adapted to be urged by the races to its parallel position when said other race is rotating relative to said one race thereby establishing the overrunning connection.

2. An overrunning coupling comprising:
   an inner race;
   an outer race situated in concentric relationship to the inner race, said races having smooth cylindrical race surfaces;
   a clutch roller of a predetermined diameter engageable with the races for establishing a one-way connection between the races;
   means pivotally supporting the roller for allowing roller movements between positions parallel and non-parallel with the axis of the races; and,
   resiliently yieldable means engaging the roller and adapted to urge the roller to its non-parallel position thereby causing the roller to become wedged between the races when one of said races is rotating relative to the other of said races thereby establishing the one-way connection between the races, said roller further adapted to be urged by the races against the force of the yieldable means to its parallel position when said other race is rotating relative to said one race thereby establishing the overrunning connection.

3. A one-way engaging device comprising:
   a driving shaft;
   a driven shaft in axial alignment with the driving shaft;
   a first member fixedly secured to one of said shafts having a smooth cylindrical race surface formed thereon;
   a second member fixedly secured to the other of said shafts having a smooth cylindrical race surface formed thereon, said race surfaces being disposed in concentric relationship and defining a concentric spatial separation therebetween;
   a roller element disposed in said spatial separation and having an axial extremity of the roller element pivotally supported for movement between parallel and non-parallel positions relative to the axis of the races, said roller element adapted when in the non-parallel position to be wedged between the races to prevent relative rotation of said members, said roller element further adapted when in the parallel position to permit relative rotation between said members; and,
   means cooperating with the roller element adjacent its other extremity for normally urging the roller element to its non-parallel wedged position.

4. A one-way engaging device for coupling relatively rotatable driving and driven elements comprising, in combination:
   a first cylindrical race member fixedly secured to one of said elements;
   a second cylindrical race member fixedly secured to the other of said elements, said race members being disposed in concentric relationship and defining a concentric spatial separation therebetween;
   means positioned in said spatial separation for defining axial recesses;
   a roller of a predetermined diameter positioned in each axial recess for pivotal movement between positions parallel and non-parallel with the axis of the races, said roller adapted when positioned parallel relative to said race members to permit said races to rotate relative to each other and further adapted when not paralleled relative to said race members to be wedged between said race members for preventing relative rotation of said race members;

means supporting one axial extremity of each of the rollers adapted to permit pivotal movement of the rollers between said parallel and non-parallel positions; and, resiliently yieldable means supported within said spatial separation and cooperating with the means defining the axial recess for engaging portions of the rollers adjacent their other extremity to normally urge said rollers to the non-parallel position.

5. An overrunning coupling comprising:
an inner race;
an outer race situated in concentric spaced relationship to the inner race, said races having smooth cylindrical race surfaces;
a reaction member including a roller of a predetermined diameter positioned between the races, said roller being engageable with said races for establishing a one-way connection therebetween;
means pivotally supporting said roller for allowing roller movements between positions parallel and non-parallel with said races; and,
yieldable biasing means supported by the reaction member and engageable with the roller adapted to urge the roller to its non-parallel position thereby causing the roller to become wedged between the races when one of said races is rotating relative to the other of said races thereby establishing the one-way connection between said races, said roller adapted to be urged by the races against the biasing force of the yieldable biasing means to its parallel position when said other race is rotating relative to said one race thereby establishing the overrunning connection.

6. The overrunning couple of claim 5 wherein the reaction member further comprises:
a sleeve situated in concentric relationship between the races non-rotatably secured to one of the races; and,
an axial recess of a predetermined shape formed in the sleeve, one axial extremity of the recess providing the roller pivotal support, said biasing means being positioned within the recess adjacent the opposite axial extremity of the recess.

7. The overrunning couple of claim 5 wherein the reaction member further comprises a pin positioned between said races and non-rotatably secured to one of said races.

8. The overrunning couple of claim 5 further comprising means cooperating with the roller for limiting the torque transmitting capabilities of the one-way connection when the roller becomes wedged between the races.

9. The overrunning couple of claim 8 wherein the means for limiting the torque transmitting capabilities comprises:
a sleeve situated in concentric relationship between the races non-rotatably secured to one of the races; and,
an axial recess formed in the sleeve, one axial extremity of the recess providing the roller pivotal support, said recess further including a wall angularly disposed a predetermined amount relative to the axis of the races for limiting roller movement toward the non-parallel position whereby the degree of roller wedge between the races is limited.

10. A unidirectional coupling mechanism comprising:
an inner race;
an outer race situated in concentric relationship with the inner race, said races having smooth cylindrical race surfaces and adapted to be relatively rotatable in one direction;
carrier means situated in concentric relationship between said races non-rotatably secured to one of said races, said carrier having circumferentially spaced axial recesses of a predetermined shape formed therein;
a roller of predetermined diameter positioned between said races and supported in each of the carrier's axial recesses, said roller having one axial extremity supported by said carrier for pivotal movement between parallel and non-parallel positions, said parallel roller position permitting relative rotation of said races; and,
means supported in the carrier's axial recess adapted to engage adjacent portions of the other axial extremity of the roller for motivating the roller to the non-parallel position whereby the roller is wedged between said races to establish a unidirectional driving connection.

11. An overrunning coupling comprising:
an inner race fixedly secured to a driven shaft;
an outer race fixedly secured to a driving shaft situated in concentric relationship to the inner race, said races having smooth cylindrical race surfaces and defining a spatial separation therebetween;
a carrier element fixedly secured to the driving shaft, said carrier including an annular body portion disposed in the spatial separation out of contact with the races;
a plurality of axially formed circumferentially spaced recesses of a predetermined shape formed in the annular body, said recesses including a wall parallel with the axis of the races and an angularly disposed wall non-parallel with the axis of the races;
a roller of a predetermined diameter disposed in each recess engageable with the race surfaces for establishing a one-way connection between the races;
means pivotally supporting an axial extremity of said rollers for permitting roller movements between parallel and non-parallel positions relative to the axis of the races; and,
a spring element engaging each roller adjacent its opposite axial extremity and adapted to bias the rollers to their non-parallel position parallel to the recess angularly disposed wall whereby the rollers are caused to be wedged between the races to establish the one-way connection, said races adapted when the inner race rotates relative to the outer race to urge the rollers to their parallel position parallel to the recess parallel wall against the spring bias to permit the coupling to overrun.

References Cited by the Examiner

UNITED STATES PATENTS

| | | | |
|---|---|---|---|
| 1,670,197 | 5/28 | Humfrey | 192—45 |
| 1,834,843 | 12/31 | Humfrey | 192—45 |
| 3,034,365 | 5/62 | Stieber | 192—30 XR |

FOREIGN PATENTS 331,928  6/59  Switzerland.

DAVID J. WILLIAMOWSKY, *Primary Examiner.*